(12) United States Patent
Yeh et al.

(10) Patent No.: US 8,364,039 B2
(45) Date of Patent: Jan. 29, 2013

(54) OPTICAL NETWORK AND OPTICAL SIGNAL MODULATION METHOD THEREOF

(75) Inventors: Chien-Hung Yeh, Hsinchu County (TW); Chi-Wai Chow, Fanling (HK)

(73) Assignee: Industrial Technology Research Institute, Hsinchu (TW)

( * ) Notice: Subject to any disclaimer, the term of this patent is extended or adjusted under 35 U.S.C. 154(b) by 420 days.

(21) Appl. No.: 12/645,416

(22) Filed: Dec. 22, 2009

(65) Prior Publication Data

US 2011/0110667 A1    May 12, 2011

(30) Foreign Application Priority Data

Nov. 10, 2009    (TW) ................ 98138084 A

(51) Int. Cl.
*H04J 14/00*    (2006.01)
(52) U.S. Cl. ................. 398/72; 398/71; 398/67; 398/69
(58) Field of Classification Search ............ 398/66, 398/67, 69, 68, 70, 71, 72, 185, 183
See application file for complete search history.

(56) References Cited

U.S. PATENT DOCUMENTS

| | | | |
|---|---|---|---|
| 5,979,385 A | 11/1999 | Speil et al. | |
| 6,111,678 A | 8/2000 | Mathoorasing et al. | |
| 6,137,611 A | 10/2000 | Boivin et al. | |
| 7,127,176 B2 | 10/2006 | Sasaki | |
| 7,965,947 B2 * | 6/2011 | Yu et al. ................ | 398/185 |
| 2008/0131120 A1 | 6/2008 | Yu et al. | |

OTHER PUBLICATIONS

Chang et al., "Novel optical-wireless access network architecture for simultaneously providing broadband wireless and wired services," Proc. OFC'06, OFM1.

Jia et al., "Simultaneous Generation and Delivery of Independent Wired and Wireless Services in Radio-over-Fiber Systems Using a Single Modulator," Proc. ECOC, Berlin, Germany, 2007, Paper 3.3.2.
Yoshida et al., "A New Single-Fiber 10-Gb/s Optical Loopback Method Using Phase Modulation for WDM Optical Access Networks," Journal of Lightwave Technology, vol. 24, No. 2, Feb. 2006, pp. 786-796.
Li et al., "A Novel PSK-Manchester Modulation Format in 10-Gb/s Passive Optical Network System With High Tolerance to Beat Interference Noise," IEEE Photonics Technology Letters, vol. 17, No. 5, May 2005, pp. 1118-1120.
Leclerc et al.,"40Gbit/s polarisation-insensitive and wavelength-independent InP Mach-Zehnder mudulator for all-optical regeneration," Electronics Letters vol. 35, No. 9, Apr. 29, 1999, pp. 730-731.
Nan-Hung Guo, "Bidirectional WiMAX over WDM-PON System Design", Thesis for Master of Department of Electronic Engineering of National Taiwan University of Science and Technology, issued on Jul. 2009.
"Office Action of Taiwan Counterpart Application", issued on Oct. 24, 2012, p. 1-p. 5.

* cited by examiner

*Primary Examiner* — M. R. Sedighian
(74) *Attorney, Agent, or Firm* — Jianq Chyun IP Office

(57) ABSTRACT

An optical network and an optical signal modulation method thereof are provided. The optical network includes an optical fiber and a remote node (RN). The RN receives a continuous carrier wave from the optical fiber and modulates the continuous carrier wave to generate a first frequency offset carrier wave The frequency of the first frequency offset carrier wave is different from that of the continuous carrier wave. A first user device re-modulates and loads data to the first frequency offset carrier wave to generate a first upstream signal. The frequency of the first upstream signal is the same as that of the first frequency offset carrier wave. The RN inputs the first upstream signal into the optical fiber.

13 Claims, 4 Drawing Sheets

OPTICAL NETWORK AND OPTICAL SIGNAL MODULATION METHOD THEREOF

CROSS-REFERENCE TO RELATED APPLICATION

This application claims the priority benefit of Taiwan application serial no. 98138084, filed on Nov. 10, 2009. The entirety of the above-mentioned patent application is hereby incorporated by reference herein and made a part of specification.

BACKGROUND

1. Field of the Disclosure

The present disclosure relates to an optical network capable of changing the frequency of an optical signal and an optical signal modulation method thereof.

2. Description of Related Art

FIG. 1 is a schematic diagram of a conventional optical network. The optical network includes a head-end 110, an optical fiber 120, and a wavelength division multiplexer (WDM) 130. The head-end 110 includes a plurality of laser sources. A single laser source 111 is demonstratively illustrated in FIG. 1. The laser source 111 provides a continuous carrier wave 151. The WDM 112 combines and outputs the continuous carrier waves emitted by all the laser sources through multiplexing. The continuous carrier wave 151 enters the optical fiber 120 via an optical circulator (OC) 113. Ideally, the cross section of an optical fiber should be a perfect round. However, actually, it may not be so perfect. Thus, the continuous carrier wave 151 produces a reflected wave 152 after traveling every small distance in the optical fiber 120, and this reflected wave 152 is the so-called Rayleigh backscattering noise.

At the other end of the optical fiber 120, the WDM 130 separates the continuous carrier waves provided by the laser sources and provides the continuous carrier waves to a plurality of user devices. For example, a user device 140 receives the continuous carrier wave 151 emitted by the laser source 111, and the user device 140 modulates and loads data to the continuous carrier wave 151 to generate an upstream signal 153. The WDM 130 combines and inputs the upstream signals generated by all the user devices into the optical fiber 120 through multiplexing. These upstream signals also produce reflected waves when they pass through the optical fiber 120. These reflected waves are received and re-modulated by the user devices and output toward the head-end 110 as the Rayleigh backscattering noises of the upstream signals. For example, the upstream signal 153 produces a Rayleigh backscattering noise 154.

Foregoing upstream signals are input into a WDM 114 via the OC 113 of the head-end 110. The WDM 114 filters the upstream signals to separate them. The head-end 110 includes a plurality of receivers for receiving all the upstream signals. A single receiver 115 is demonstratively illustrated in FIG. 1, and which receives the upstream signal 153.

Besides the upstream signal 153, the Rayleigh backscattering noise 152 of the continuous carrier wave 151 and the Rayleigh backscattering noise 154 of the upstream signal 153 are also received by the receiver 115, and these signals have the same wavelength. Accordingly, the reception of the upstream signal 153 is interfered by the Rayleigh backscattering noises 152 and 154.

SUMMARY OF THE DISCLOSURE

Accordingly, the present disclosure is directed to an optical network capable of changing the frequency of an optical signal and an optical signal modulation method thereof, wherein interference of Rayleigh backscattering noises of a continuous carrier wave and an upstream signal to the upstream signal is reduced.

According to an exemplary embodiment of the present disclosure, an optical network including an optical fiber and a remote node (RN) is provided. The RN receives a continuous carrier wave from the optical fiber and modulates the continuous carrier wave to generate a first frequency offset carrier wave, wherein the frequency of the first frequency offset carrier wave is different from that of the continuous carrier wave. A first user device re-modulates and loads data to the first frequency offset carrier wave to generate a first upstream signal, wherein the frequency of the first upstream signal is the same as that of the first frequency offset carrier wave. The RN inputs the first upstream signal into the optical fiber.

According to an exemplary embodiment of the present disclosure, an optical signal modulation method suitable for an optical network is provided. The optical network includes an optical fiber and a RN. The optical signal modulation method includes following steps. First, the RN receives a continuous carrier wave from the optical fiber and modulates the continuous carrier wave to generate a first frequency offset carrier wave, wherein the frequency of the first frequency offset carrier wave is different from that of the continuous carrier wave. A first user device re-modulates and loads data to the first frequency offset carrier wave to generate a first upstream signal, wherein the frequency of the first upstream signal is the same as that of the first frequency offset carrier wave. The RN inputs the first upstream signal into the optical fiber.

According to exemplary embodiments of the present disclosure, a frequency modulation technique is adopted to make the frequency of an upstream signal different from that of a Rayleigh backscattering noise of the upstream signal and that of a Rayleigh backscattering noise of a continuous carrier wave. Thereby, interference of the two Rayleigh backscattering noises to the upstream signal is reduced.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
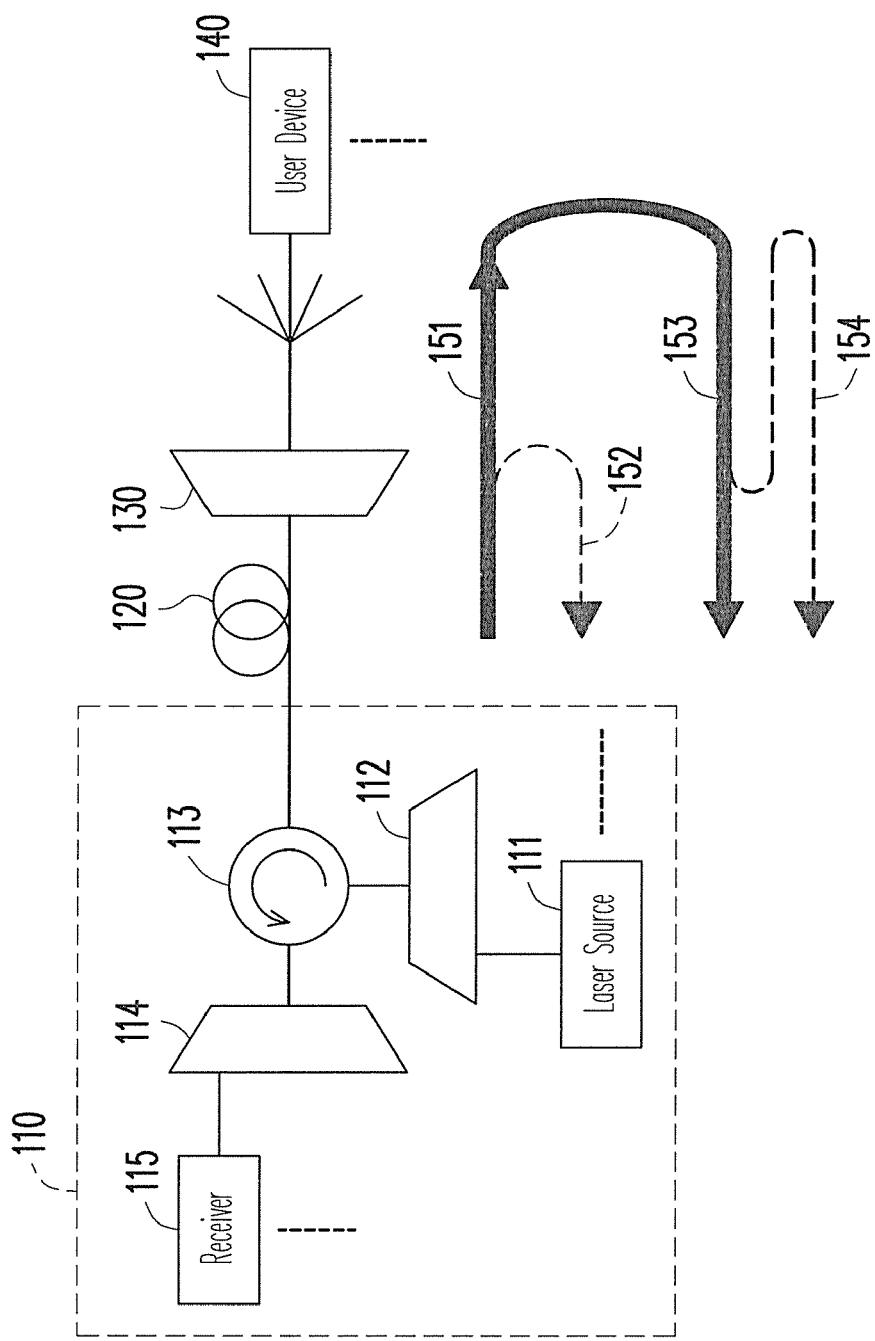
FIG. 1 is a schematic diagram of a conventional optical network.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
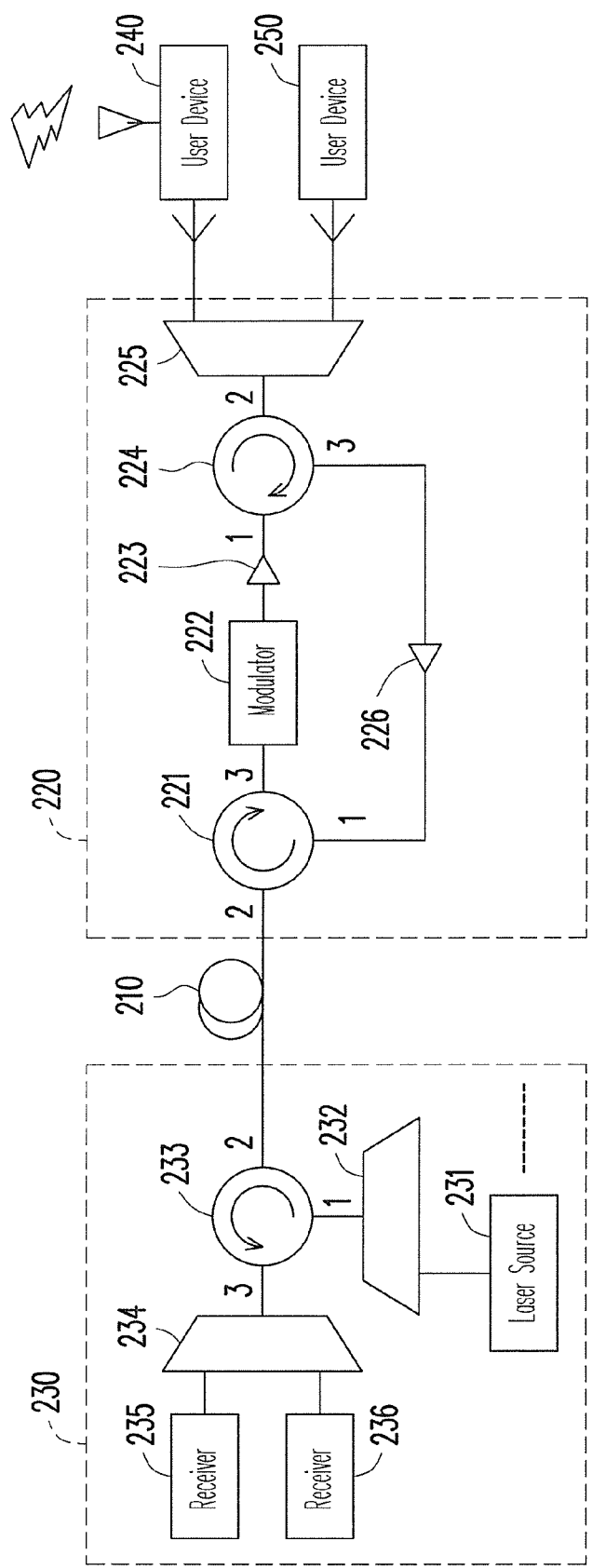
FIG. 2 is a schematic diagram of an optical network according to an embodiment of the present disclosure.
Figure 3:
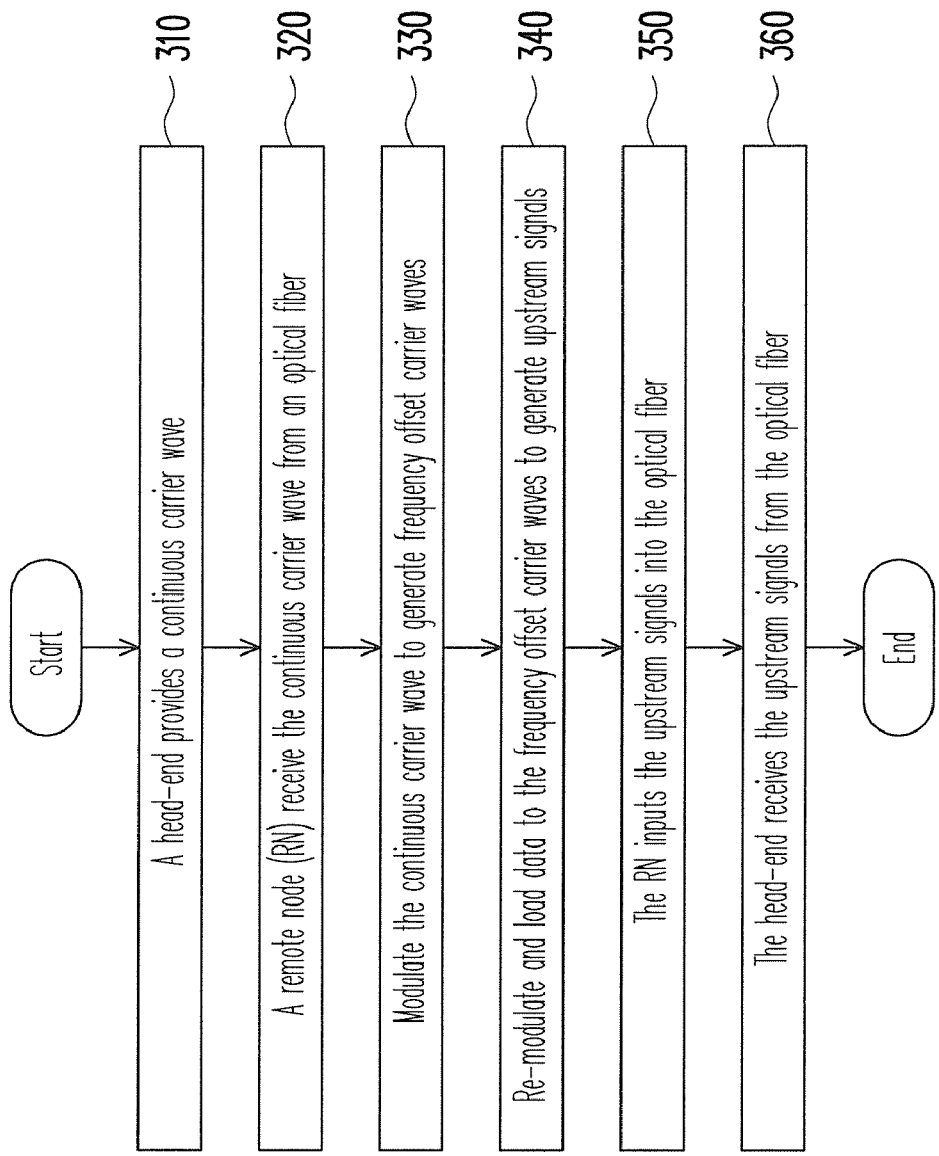
FIG. 3 is a flowchart of an optical signal modulation method according to an embodiment of the present disclosure.

FIG. 2 is a schematic diagram of an optical network according to an embodiment of the present disclosure, and FIG. 3 is a flowchart of an optical signal modulation method executed by this optical network. The optical network includes a head-end 230, an optical fiber 210, and a remote node (RN) 220. The head-end 230 includes a laser source 231, wavelength division multiplexers (WDMs) 232 and 234, an optical circulator (OC) 233, and receivers 235 and 236. The RN 220 includes OC 221 and 224, a modulator 222, optical amplifiers 223 and 226, and a WDM 225. The WDMs 225, 232, and 234 may be implemented by using arrayed waveguide gratings (AWGs). Each of the OCs 221, 224, and 233 has 3 input/output ports marked as 1, 2, and 3 in FIG. 2.

Referring to FIG. 2 and FIG. 3, the head-end 230 includes a plurality of laser sources. A continuous carrier wave emitted by each laser source goes through the same process. Accordingly, a laser source 231 will be described as an example. The laser source 231 provides a continuous carrier wave to the WDM 232. The WDM 232 combines and inputs the continuous carrier waves provided by all the laser sources into a first port of the OC 233 through multiplexing. The OC 233 outputs the optical signals received from the first port thereof through the second port thereof (step 310). The second port of the OC 233 and the second port of the OC 221 are coupled with each other through the optical fiber 210. Accordingly, foregoing optical signals enter the second port of the OC 221 via the optical fiber 210, and the OC 221 outputs all the optical signals received by the second port thereof through the third port thereof.

The modulator 222 receives the continuous carrier waves provided by the laser sources from the third port of the OC 221 (step 320) and modulates each of the continuous carrier waves. Two frequency offset carrier waves are generated corresponding to each modulated continuous carrier wave (step 330), wherein the frequency of a first frequency offset carrier wave is smaller than that of the corresponding continuous carrier wave, and the frequency of a second frequency offset carrier wave is greater than that of the corresponding continuous carrier wave. The modulator 222 outputs all the frequency offset carrier waves. The optical amplifier 223 amplifies these frequency offset carrier waves and then outputs them into the first port of the OC 224. The OC 224 outputs the optical signals received by the first port thereof through the second port thereof.

The WDM 225 filters the optical signals output by the second port of the OC 224 to separate the frequency offset carrier waves, and the WDM 225 provides the frequency offset carrier waves respectively to a plurality of user devices. Herein each of the user devices may be a wireless remote antenna unit (RAU) or a wired optical network unit (ONU). The user devices 240 and 250 respectively receive the two frequency offset carrier waves corresponding to the laser source 231. The user device 240 is a RAU, and which receives the first frequency offset carrier wave and re-modulates and loads data to the first frequency offset carrier wave to generate a corresponding first upstream signal, wherein the frequency of the first upstream signal is the same as that of the corresponding first frequency offset carrier wave. The user device 250 is an ONU, and which receives the second frequency offset carrier wave and re-modulates and loads data to the second frequency offset carrier wave to generate a corresponding second upstream signal, wherein the frequency of the second upstream signal is the same as that of the corresponding second frequency offset carrier wave (step 340).

After that, each user device uploads its upstream signal to the WDM 225. The WDM 225 combines and inputs all the upstream signals into the second port of the OC 224. The OC 224 outputs all the optical signals received by the second port thereof through the third port thereof. The third port of the OC 224 and the first port of the OC 221 are coupled with each other through the optical amplifier 226. Thus, the upstream signals are amplified by the optical amplifier 226 and then input into the first port of the OC 221. The OC 221 outputs all the optical signals received by the first port thereof through the second port thereof to the optical fiber 210 (step 350).

The OC 233 receives all the optical signals from the optical fiber 210 through the second port thereof and outputs these optical signals through the third port thereof. The WDM 225 filters the optical signals output by the third port of the OC 233 to separate the upstream signals. The separated upstream signals are received by the receivers of the head-end 230, wherein the receiver 235 receives the first upstream signal corresponding to the laser source 231, and the receiver 236 receives the second upstream signal corresponding to the laser source 231 (step 360).

Figure 4:
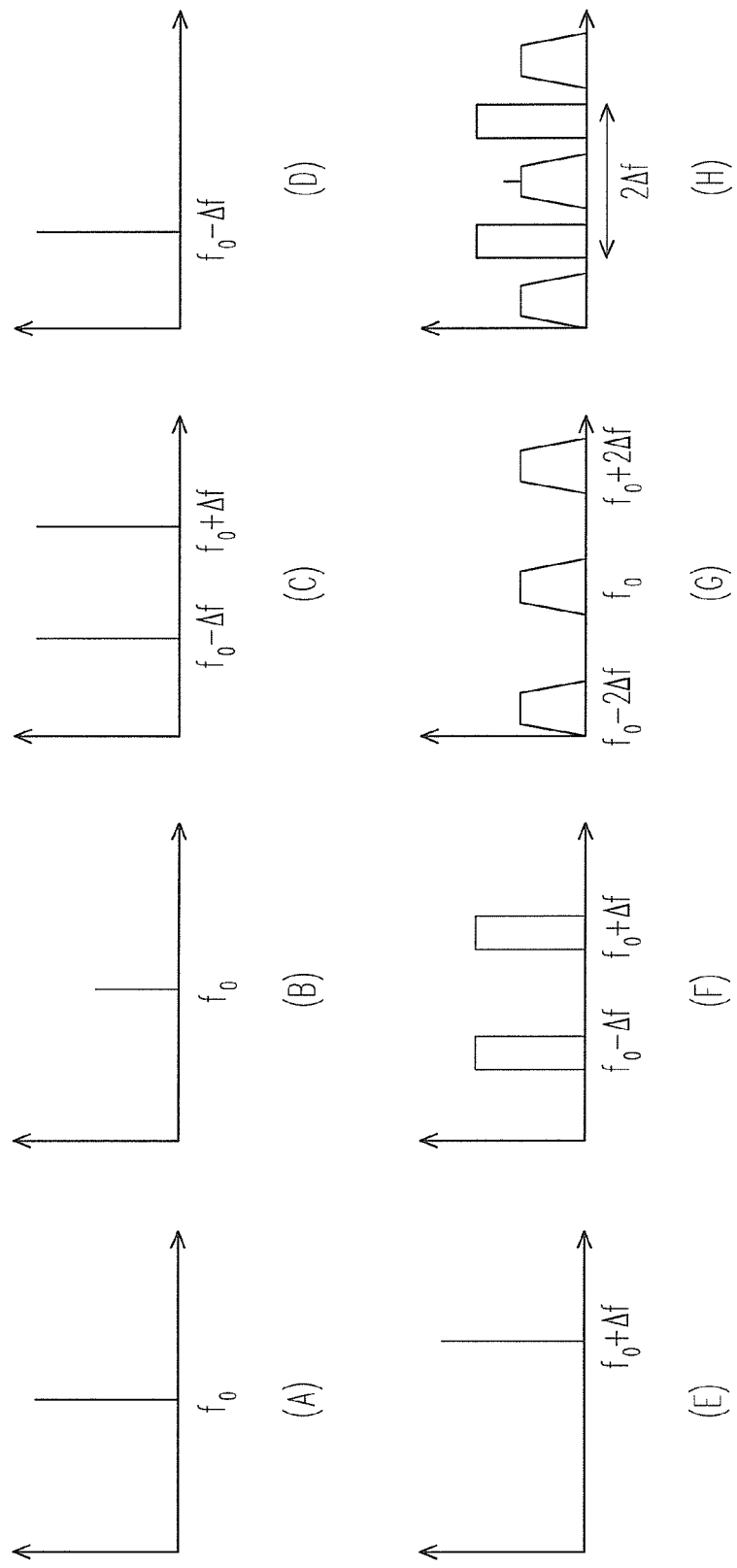
FIG. 4 illustrates signal spectra in the optical network illustrated in FIG. 2.

FIG. 4 illustrates the continuous carrier wave emitted by the laser source 231 and the spectra of related signals in the optical network illustrated in FIG. 2. Assuming that the frequency of the continuous carrier wave emitted by the laser source 231 is $f_0$, as shown in FIG. 4(A), the frequency of the Rayleigh backscattering noise produced when the continuous carrier wave passes through the optical fiber 210 is also $f_0$, as shown in FIG. 4(B). In the present embodiment, the modulator 222 is a Mach-Zehnder modulator (MZM). After the continuous carrier wave is modulated by the modulator 222, a first frequency offset carrier wave having a frequency of $f_0-\Delta f$ and a second frequency offset carrier wave having a frequency of $f_0+\Delta f$ are generated, as shown in FIG. 4(C), wherein $\Delta f$ is a predetermined value of MZM. After being separated by the WDM 225, the first frequency offset carrier wave is received by the user device 240 (as shown in FIG. 4(D)), and the second frequency offset carrier wave is received by the user device 250 (as shown in FIG. 4(E)).

The user devices 240 and 250 respectively re-modulate and load data to the two frequency offset carrier waves to respectively generate a first upstream signal having a frequency of $f_0-\Delta f$ and a second upstream signal having a frequency of $f_0+\Delta f$, as shown in FIG. 4(F). These two upstream signals also produce Rayleigh backscattering noises when they pass through the optical fiber 210. After these Rayleigh backscattering noise are modulated for the second time by the modulator 222, the frequency of the first upstream signal changes from $f_0-\Delta f$ to $f_0-2\Delta f$ and $f_0$, and the frequency of the second upstream signal changes from $f_0+\Delta f$ to $f_0$ and $f_0+2\Delta f$. After that, the Rayleigh backscattering noises of the two upstream signals are re-modulated and loaded data with by the user devices 240 and 250 and pass through the optical fiber 210 again. By now, the Rayleigh backscattering noises of the two upstream signals are as shown in FIG. 4(G).

The optical signals received by the OC 233 from the optical fiber 210 is a combination of the Rayleigh backscattering noise of the continuous carrier wave in FIG. 4(B), the two upstream signals in FIG. 4(F), and the Rayleigh backscattering noises of the upstream signals in FIG. 4(G), as shown in FIG. 4(H). Because the modulator 222 changes the frequencies of the continuous carrier waves, the frequencies of the two upstream signals are different from those of foregoing two Rayleigh backscattering noises, so that the WDM 234 can filters the signals to obtain the two upstream signals having the frequencies $f_0-\Delta f$ and $f_0+\Delta f$ without being affected by foregoing two Rayleigh backscattering noises. In the present embodiment, the Rayleigh backscattering noises of the continuous carrier wave and the upstream signals are reduced through the mechanism described above.

Even though the modulator in the RN is implemented by using a MZM in the embodiment described above, the present disclosure is not limited thereto. The Rayleigh backscattering noises in the continuous carrier wave and the upstream signals can be reduced by adopting any modulator that is capable of changing the frequency of the continuous carrier wave. It is not necessary for the modulator in the RN to generate two frequency offset carrier waves according to each continuous carrier wave. Instead, the modulator may also generate only one frequency offset carrier wave as long as it can change the frequency of the continuous carrier wave.

As described above, in the present disclosure, a continuous carrier wave emitted by a laser source is modulated so that Rayleigh backscattering noises in the continuous carrier wave and upstream signals can be reduced. The continuous carrier wave emitted by each laser source can be modulated by disposing a single modulator in a RN. Since it is not needed to dispose multiple modulators, the system cost is reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An optical network, comprising:
   an optical fiber; and
   a remote node (RN), for receiving a continuous carrier wave from the optical fiber and modulating the continuous carrier wave to generate a first frequency offset carrier wave and a second frequency offset carrier wave, wherein a frequency of the first frequency offset carrier wave is smaller than a frequency of the continuous carrier wave, a frequency of the second frequency offset carrier wave is greater than the frequency of the continuous carrier wave; a first user device re-modulates and loads data to the first frequency offset carrier wave to generate a first upstream signal, a frequency of the first upstream signal is the same as the frequency of the first frequency offset carrier wave, and the RN inputs the first upstream signal into the optical fiber; a second user device re-modulates and loads data to the second frequency offset carrier wave to generate a second upstream signal, a frequency of the second upstream signal is the same as the frequency of the second frequency offset carrier wave, and the RN inputs the second upstream signal into the optical fiber.

2. The optical network according to claim 1, wherein a frequency difference between the first frequency offset carrier wave and the continuous carrier wave is equal to a frequency difference between the second frequency offset carrier wave and the continuous carrier wave.

3. The optical network according to claim 1, wherein one of the first user device and the second user device is a remote antenna unit (RAU), and the other one of the first user device and the second user device is an optical network unit (ONU).

4. The optical network according to claim 1, wherein the RN comprises:
   a first optical circulator (OC), having a first port, a second port, and a third port, for outputting an optical signal received by the first port through the second port and outputting an optical signal received by the second port through the third port, wherein the second port is coupled to the optical fiber;
   a second OC, having a first port, a second port, and a third port, for outputting an optical signal received by the first port through the second port and outputting an optical signal received by the second port through the third port, wherein the third port of the second OC is coupled to the first port of the first OC;
   a modulator, for receiving the continuous carrier wave from the third port of the first OC, modulating the continuous carrier wave to generate the first frequency offset carrier wave and the second frequency offset carrier wave, and inputting the first frequency offset carrier wave and the second frequency offset carrier wave into the first port of the second OC; and
   a first wavelength division multiplexer (WDM), for filtering optical signals output by the second port of the second OC, separating the first frequency offset carrier wave and the second frequency offset carrier wave and providing the first frequency offset carrier wave and the second frequency offset carrier wave respectively to the first user device and the second user device, receiving the first upstream signal and the second upstream signal respectively from the first user device and the second user device, and combining and inputting the first upstream signal and the second upstream signal into the second port of the second OC.

5. The optical network according to claim 4, wherein the modulator is a Mach-Zehnder modulator (MZM).

6. The optical network according to claim 4, wherein the RN further comprises:
   a first optical amplifier, for amplifying optical signals output by the modulator to the first port of the second OC; and
   a second optical amplifier, for amplifying optical signals output by the third port of the second OC to the first port of the first OC.

7. The optical network according to claim 1 further comprising:
   a head-end, coupled to the RN through the optical fiber, for providing the continuous carrier wave and receiving the first upstream signal and the second upstream signal from the optical fiber.

8. The optical network according to claim 7, wherein the head-end comprises:
   a third OC, having a first port, a second port, and a third port, for outputting an optical signal received by the first port through the second port and outputting an optical signal received by the second port through the third port, wherein the second port is coupled to the RN through the optical fiber;
   a laser source, for providing the continuous carrier wave;
   a second WDM, for receiving the continuous carrier wave from the laser source and inputting the continuous carrier wave into the first port of the third OC through multiplexing;
   a third WDM, for filtering optical signals output by the third port of the third OC and separating the first upstream signal and the second upstream signal;
   a first receiver, for receiving the first upstream signal from the third WDM; and
   a second receiver, for receiving the second upstream signal from the third WDM.

9. An optical signal modulation method, suitable for an optical network, wherein the optical network comprises an optical fiber and a remote node (RN), the optical signal modulation method comprising:
   the RN receiving a continuous carrier wave from the optical fiber;
   the RN modulating the continuous carrier wave to generate a first frequency offset carrier wave and a second frequency offset carrier wave, wherein a frequency of the first frequency offset carrier wave is smaller than a frequency of the continuous carrier wave, a frequency of the second frequency offset carrier wave is greater than the frequency of the continuous carrier wave; a first user device re-modulates and loads data to the first frequency offset carrier wave to generate a first upstream signal, and a frequency of the first upstream signal is the same as the frequency of the first frequency offset carrier wave; a second user device re-modulates and loads data to the second frequency offset carrier wave to generate a second upstream signal, and a frequency of the second upstream signal is the same as the frequency of the second frequency offset carrier wave; and the RN inputting the first upstream signal and the second upstream signal into the optical fiber.

10. The optical signal modulation method according to claim 9, wherein a frequency difference between the first frequency offset carrier wave and the continuous carrier wave is equal to a frequency difference between the second frequency offset carrier wave and the continuous carrier wave.

11. The optical signal modulation method according to claim 9, wherein one of the first user device and the second user device is a remote antenna unit (RAU), and the other one of the first user device and the second user device is an optical network unit (ONU).

12. The optical signal modulation method according to claim 9, wherein the RN uses a Mach-Zehnder modulator (MZM) to modulate the continuous carrier wave, so as to generate the first frequency offset carrier wave and the second frequency offset carrier wave.

13. The optical signal modulation method according to claim 9, wherein the optical network further comprises a head-end coupled to the RN through the optical fiber, and the optical signal modulation method further comprises:

the head-end providing the continuous carrier wave to the optical fiber; and the head-end receiving the first upstream signal and the second upstream signal from the optical fiber.

* * * * *